W. KEARNS.
RELINER AND THE METHOD OF MAKING THE SAME.
APPLICATION FILED AUG. 12, 1915.
1,258,121.                                    Patented Mar. 5, 1918.
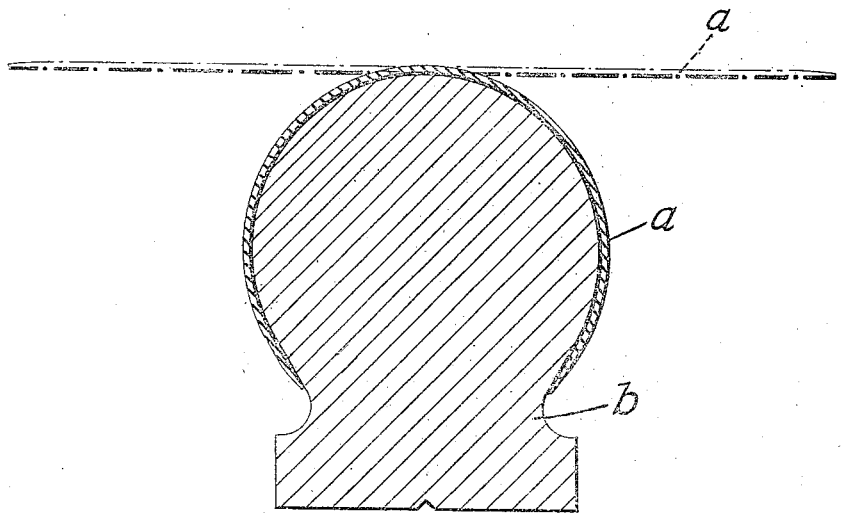
WITNESS:                                      INVENTOR
S. H. Taylor                                  William Kearns,
                                              BY Ernest Hopkinson
                                              HIS ATTORNEY

UNITED STATES PATENT OFFICE.

WILLIAM KEARNS, OF DETROIT, MICHIGAN, ASSIGNOR TO MORGAN & WRIGHT, A CORPORATION OF MICHIGAN.

RELINER AND THE METHOD OF MAKING THE SAME.

1,258,121.  Specification of Letters Patent.  Patented Mar. 5, 1918.

Application filed August 12, 1915. Serial No. 45,098.

*To all whom it may concern:*

Be it known that I, WILLIAM KEARNS, a citizen of the United States, and a resident of Detroit, county of Wayne, and State of Michigan, have invented certain new and useful Improvements in Reliners and the Methods of Making the Same, of which the following is a full, clear, and exact description.

This invention relates to the method of manufacturing reliners for pneumatic vehicle tire casings.

By a "reliner" is meant a built up structure of rubber and fabric plies adapted to fit within a tire casing between its inner surface and the inner tube, ordinarily utilized when the casing has become worn or ruptured to such an extent that sufficient support for the inner tube is not given. By the use of a reliner considerable additional mileage can be obtained from the old casing.

It is necessary that the reliner be caused to adhere to the wall of the casing, and it is an object of this invention to produce on the article a "tacky" surface which will stick thereto with sufficient firmness to obviate all danger of circumferential slipping.

Another object of this invention is to combine the plies of material during the building up of the article so that when it is subjected to its final setting cure the various parts will be strongly united into a substantially unitary structure.

By my method I accomplish the desired results with a minimum of labor, apparatus, and floor-space, all more fully set forth in the following description and illustrated in the accompanying drawings, wherein:

The figure is a cross-sectional view of a ring core with a reliner in place thereon for final curing.

In the drawing *a* designates a reliner and *b* designates a ring core.

My method comprises the following steps:—

A plurality of fabric strips are frictioned on one or both sides with rubber or rubber composition having incorporated therein a suitable amount of sulfur to permit proper vulcanization, and to the unfrictioned side of one I apply a "skim coating" of so-called nonvulcanizing stock, *i. e.*, rubber compounded without sulfur.

The plies are next superposed with the skim-coating forming one surface, and the whole subjected to mechanical or fluid pressure and heat, in case a press is used, the skim-coating being separated from the press plate by a thick pad of holland or other suitable material. During the application of the pressure sufficient heat is applied to partially vulcanize the rubber frictioning between the plies of material, and cause them to adhere. The pressure removes all air pockets from the material thereby preventing blisters and at the same time causes the softened frictioning on the several plies to flow together into a substantially continuous mass. Inasmuch as the reliner is still unshaped, however, care is taken that the preliminary heat treatment is not continued long enough to set the rubber, that is, not destroy its plasticity. It merely serves to sufficiently soften the stock to cause flowing together of the several strata, and at the same time permit the escape of expressed fluids. In case a fluid pressure is used for the preliminary partial cure it is preferable at some time, either simultaneously or previous thereto to also apply a compacting mechanical pressure to firmly unite the parts. However, if the confining pressure applied during the partial cure for the prevention of blisters is a mechanical one and not fluid, it also serves to compact the plies.

The partially cured structure *a* is then given the proper shape by applying it to a ring core *b* having the contour of the inside of a tire casing, the face of unvulcanizing stock being laid against the surface of the core *b*. The reliner is pounded into close contact with the surface of the core, preferably with wedge shaped blocks, so that it is shaped from the flat form shown in broken lines in the drawing to the curved form shown in full lines, and the whole then introduced into an open heat vulcanizer. No wrapping or mold sections are required to maintain the reliner *a* in position on the core *b*, the plasticity of the partially cured frictioning and the bias cut of the fabric permitting distortion to the shape of the core, on which it is held in place by the adhesiveness of the unvulcanized skim coat.

To permanently fix the shape of the reliner on the core, live steam, or any other suitable heated vulcanizing medium is introduced into the vulcanizing chamber, and the temperature there maintained at the proper degree for a sufficient period to fully vulcanize the rubber uniting the fabric plies. The skin coat, however, being compounded without sulfur is unaffected by the heat treatment, but remains in a plastic condition.

Having completed the cure, to adapt the reliner for use, it is merely necessary to turn it inside out, so that the coating of unvulcanized rubber, heretofore the inside layer, becomes the exterior surface.

A reliner built according to the method above outlined has smooth, even surfaces on both sides, and has its several plies firmly united by a substantially continuous network of vulcanized rubber throughout the interstices of the weave. The rubber skim-coat being compounded without sulfur is of a permanently "tacky" or sticky nature and supplies an adhesive outer surface to the reliner which will readily adhere to the inside of a tire casing, thereby obviating the necessity for cement.

Having thus described my invention, what I claim and desire to protect by Letters Patent is:

1. A reliner for tires comprising a carcass formed of fabric and rubber having a fixed contour substantially similar to that of the inner surface of a tire-casing, the inner surface of said carcass being provided with a coating of non-vulcanizable rubber.

2. A reliner for tires comprising a carcass substantially circular in cross-section, composed of a plurality of superposed plies of rubberized fabric, the inner surface of said plies being provided with an exterior layer of non-vulcanizable rubber, said carcass being reversible to dispose the non-vulcanizable layer of rubber on the exterior thereof.

3. A method of manufacturing reliners which comprises assembling plies of rubberized fibrous material, applying directly to the outer surface of the outer ply a layer of non-vulcanizable rubber compound, compressing the plies and causing the rubber thereon to flow together, partially vulcanizing the plies while under such compression, shaping the partially vulcanized plies upon a core with the ply bearing the layer of non-vulcanizable rubber compound disposed nearest the core and completing the vulcanization thereof.

4. A reliner for tires comprising a carcass substantially circular in cross-section, composed of a plurality of superposed fabric layers united together by rubber, the outer surface of said plies having a coating of non-vulcanizable rubber directly applied thereto.

5. A reliner for tires comprising a carcass substantially circular in cross-section, said carcass being composed of a plurality of superposed plies of fabric united together by rubber, the outer surface of one of said plies having a coating of non-vulcanizable rubber directly applied thereto.

6. A method of manufacturing reliners which comprises building the article of plies of vulcanizable rubber compound and fibrous material, compressing the plies, setting the plies while in a flat state and under said compression by partial vulcanization, applying to the outer surface of the article a layer of non-vulcanizable rubber compound, shaping the plies upon a core in reverse position with the unvulcanizable rubber adjacent the core to maintain the shaped article in contact therewith, and finally completing the vulcanization.

Signed at Detroit, county of Wayne, and State of Michigan, this 29th day of July, 1915.

WILLIAM KEARNS.